(12) United States Patent
Chang

(10) Patent No.: US 8,742,611 B2
(45) Date of Patent: Jun. 3, 2014

(54) HYDROPOWER GENERATING SYSTEM

(75) Inventor: Yao-Ting Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 13 days.

(21) Appl. No.: 13/405,372

(22) Filed: Feb. 27, 2012

(65) Prior Publication Data

US 2012/0326444 A1 Dec. 27, 2012

(30) Foreign Application Priority Data

Jun. 24, 2011 (TW) .............................. 100122140 A

(51) Int. Cl.
*F03B 13/00* (2006.01)
(52) U.S. Cl.
USPC .......................................................... 290/54
(58) Field of Classification Search
USPC .......................................................... 290/54
See application file for complete search history.

(56) References Cited

U.S. PATENT DOCUMENTS

| | | | | |
|---|---|---|---|---|
| 4,352,025 A | * | 9/1982 | Troyen ............................ | 290/54 |
| 4,408,127 A | * | 10/1983 | Santos, Sr. ...................... | 290/54 |
| 4,443,707 A | * | 4/1984 | Scieri et al. .................... | 290/4 R |
| 4,918,369 A | * | 4/1990 | Solorow .......................... | 322/35 |
| 7,274,566 B2 | * | 9/2007 | Campbell et al. .............. | 361/699 |
| 7,278,273 B1 | * | 10/2007 | Whitted et al. ................ | 62/259.2 |
| 7,296,429 B2 | * | 11/2007 | Tanaka et al. ................. | 62/238.6 |
| 7,738,251 B2 | * | 6/2010 | Clidaras et al. ............... | 361/701 |
| 7,818,973 B2 | * | 10/2010 | Tanaka et al. ................. | 62/238.6 |
| 2004/0206681 A1 | * | 10/2004 | Gordon .......................... | 210/259 |
| 2009/0295167 A1 | * | 12/2009 | Clidaras et al. ................ | 290/55 |
| 2011/0240497 A1 | * | 10/2011 | Dechene et al. ............... | 206/320 |

* cited by examiner

*Primary Examiner* — Joseph Waks
(74) *Attorney, Agent, or Firm* — Novak Druce Connolly Bove + Quigg LLP

(57) ABSTRACT

A hydropower generating system includes a pump, a container data center, and a hydropower generating module. The container data center includes a number of cooling pipes. Each of the cooling pipes includes a water intake and a water outlet. The water outlet is connected to the pump. The pump is for pumping water from a source to the cooling pipes. The water flows along the pipes to dissipate the heat generated by the container data center. The hydropower generating module includes a turbine and a generator. The turbine is arranged under the water outlet. The hydropower generating module is electrically connected to the pump. The water flowing out from the water outlets is able to turn the turbine, causing the turbine to drive the generator to generate electrical power, the generated electrical power is supplied to the pump.

5 Claims, 2 Drawing Sheets

HYDROPOWER GENERATING SYSTEM

BACKGROUND

1. Technical Field

The present disclosure relates to hydropower generating systems, and particularly, to a hydropower generating system in which the water can be recycled.

2. Description of Related Art

Cooling systems contained in container data centers usually include a number of cooling pipes. Water flows in the cooling pipes to dissipate the heat generated by the servers contained in the data center. It is useful if the water can be recycled.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure will now be described in detail, with reference to the accompanying drawings.

Figure 1:
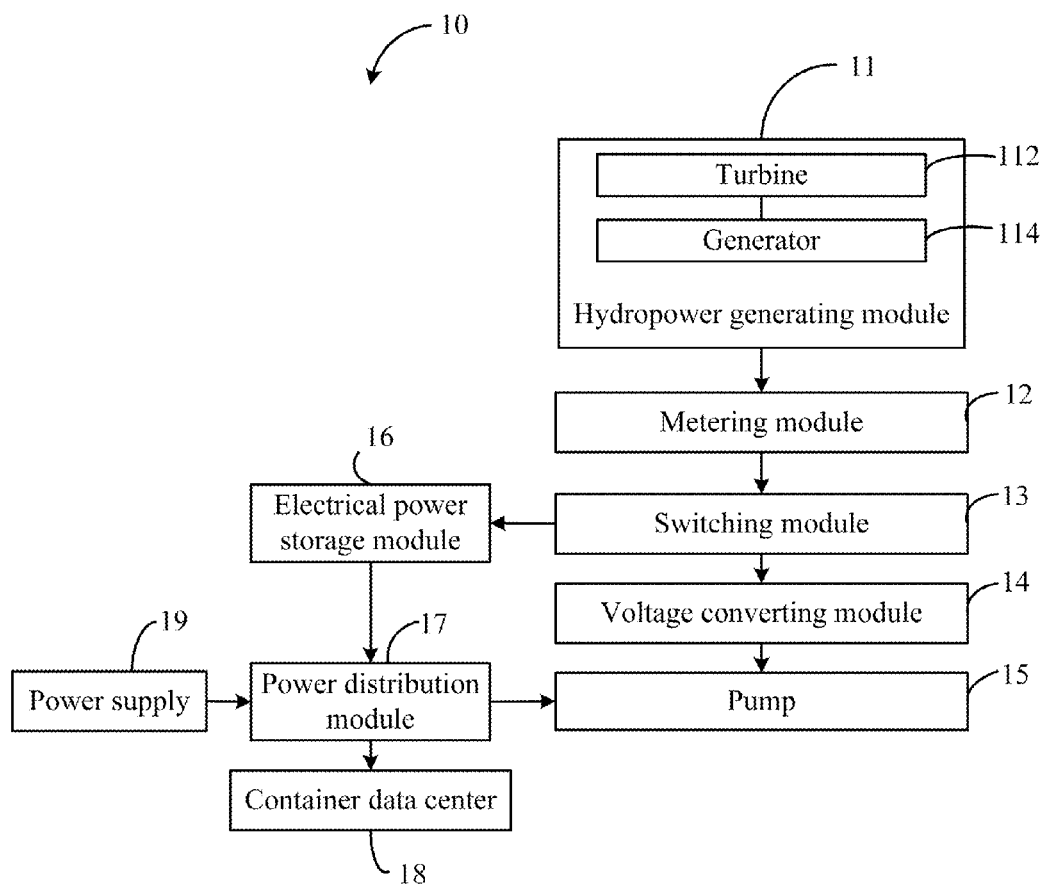
FIG. 1 is a block diagram showing electrical connections of a hydropower generating system in accordance with an exemplary embodiment.
Figure 2:
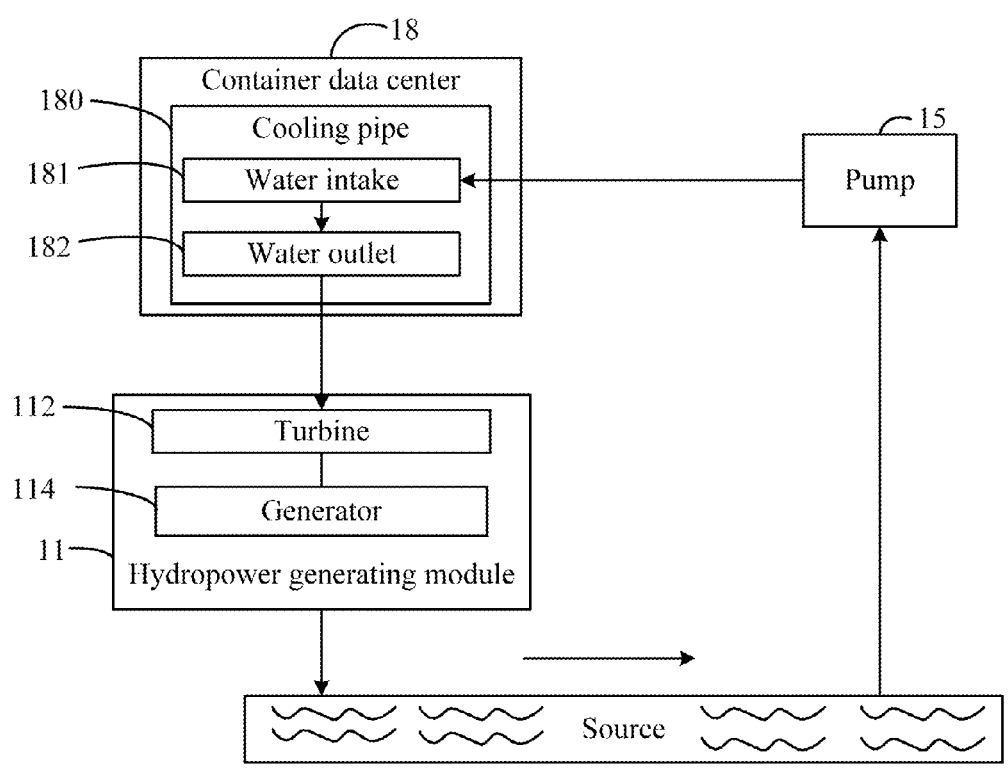
FIG. 2 is a schematic diagram of a water cycle system connected to the hydropower generating system of FIG. 1.

Referring to FIGS. 1-2, an embodiment of a hydropower generating system 10 includes a hydropower generating module 11, a metering module 12, a switching module 13, a voltage converting module 14, a pump 15, an electrical power storage module 16, a power distribution module 17, a container data center 18, and a power supply 19.

The container data center 18 includes a number of cooling pipes 180 (one shown). Each of the cooling pipes includes a water intake 181 and a water outlet 182. The water outlets 182 are connected to the pump 15 which pumps water from sources, such as the ocean, a river, or a lake, to the cooling pipes 180. The water flows through the cooling pipes 180 and dissipates the heat generated by servers (not shown) contained in the container data center 18. In this embodiment, the pump 15 uses alternating-current (AC).

The hydropower generating module 11 includes a turbine 112 and a generator 114. The turbine 112 is arranged under the container data center 18. Thus, there is a height difference between the water outlets 182 and the turbine 112. For example, the container data center 18 is arranged on the top of a building, and the hydropower generating module 11 is arranged on the ground near the building. The water flows out from the water outlets 182 and pours down to turn the turbine 112. The turning turbine 112 drives the generator 114 to generate electrical power. The water can then be directed to a drain or the water source, or collected for other use. In this embodiment, the electrical power generated by the hydropower generating module 11 is direct-current.

The metering module 12 is electrically connected between the hydropower generating module 11 and the switching module 13. The switching module 13 is selectably connects metering module 12 to the voltage converting module 14 or the electrical power storage module 16. The voltage converting module 14 is connected to the pump 15. The power distribution module 17 is connected to the power storage module 16, the container data center 18, the power supply 19, and the pump 15 respectively.

The metering module 12 measures the electrical power generated by the hydropower generating module 11, and determines whether the generated electrical power is sufficient to power the pump 15. If the metering module 12 determines that the generated electrical power is sufficient to power the pump 15, the switching module 13 connects the voltage converting module 14 to the pump 15. The voltage converting module 14 then converts the generated electrical power from direct-current to alternating-current, and supplies the converted electrical power to the pump 15. If the metering module 12 determines that the generated electrical power is insufficient to power the pump 15, the switching module 13 connects the electrical power storage 16 to the power distribution module 17. The storage module 16 stores the electrical power generated by the hydropower generating module 11. The power distribution module 17 distributes the electrical power stored in the storage module 16 and the power supplied by the power supply 19 to the container data center 18 and the pump 15.

In an alternative embodiment, the pump 15 may be a direct-current pump, and the voltage converting module 14 can be omitted. In other embodiments, the electrical power generated by the hydropower generating module 11 may be alternating-current, and the pump 15 is alternating-current, the voltage converting module 14 can be omitted.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A hydropower generating system comprising:
   a pump;
   a container data center comprising a plurality of cooling pipes, each of the cooling pipes comprising a water intake and a water outlet, the water intake being connected to the pump which pumps water from sources to the cooling pipes, water flowing through the cooling pipes to dissipate the heat in the container data center;
   a hydropower generating module comprising a turbine and a generator, the turbine being arranged under the container data center, wherein the hydropower generating module is electrically connected to the pump, the water flows out from the water outlets is able to turn the turbine, causing the turbine to drive the generator to generate electrical power, the generated electrical power is supplied to the pump;
   a metering module to measure the electrical power generated by the hydropower generating module and determine whether the generated electrical power is sufficient to power the pump;
   an electrical power storage module;
   a voltage converting module connected to the pump; and
   a switching module arranged between the electrical power storage module and the voltage converting module, wherein the switching module connects the metering module to the voltage converting module when the generated electrical power is sufficient to power the pump, and connects the metering module to the electrical power storage module when the generated electrical power is insufficient to power the pump.

2. The hydropower generating system as described in claim 1, wherein the electrical power generated by the hydropower generating module is direct-current and the pump uses alternating-current, the voltage converting module converts the electrical power generated by the hydropower generating module from direct-current to alternating-current when the generated electrical power is sufficient to power the pump.

3. The hydropower generating system as described in claim 1, wherein the hydropower generating module further comprises a power distribution module, the power storage module is electrically connected between the hydropower generating module and the power distribution module, the power distribution module is electrically connected to the container data center, the power storage module is configured to store the electrical power generated by the hydropower generating module, the power distribution module is configured to distribute the stored electrical power to the container data center and the pump.

4. The hydropower generating system as described in claim 3, wherein the hydropower generating system further comprises a power supply, the power supply is connected to the power distribution module, the power distribution module distributes the power supplied by the power supply to the container data center and the pump.

5. The hydropower generating system as described in claim 1, wherein the container data center is arranged on the top of a building, and the hydropower generating module is arranged on the ground near the building.

* * * * *